Sept. 24, 1929.   E. C. PRICE ET AL   1,729,359
HIGHWAY GRADE CROSSING FOR RAILWAYS
Original Filed March 9, 1927   5 Sheets-Sheet 1

Inventors
Evan C. Price
Thomas L. Hanley
By Staley & Mich
Attorneys

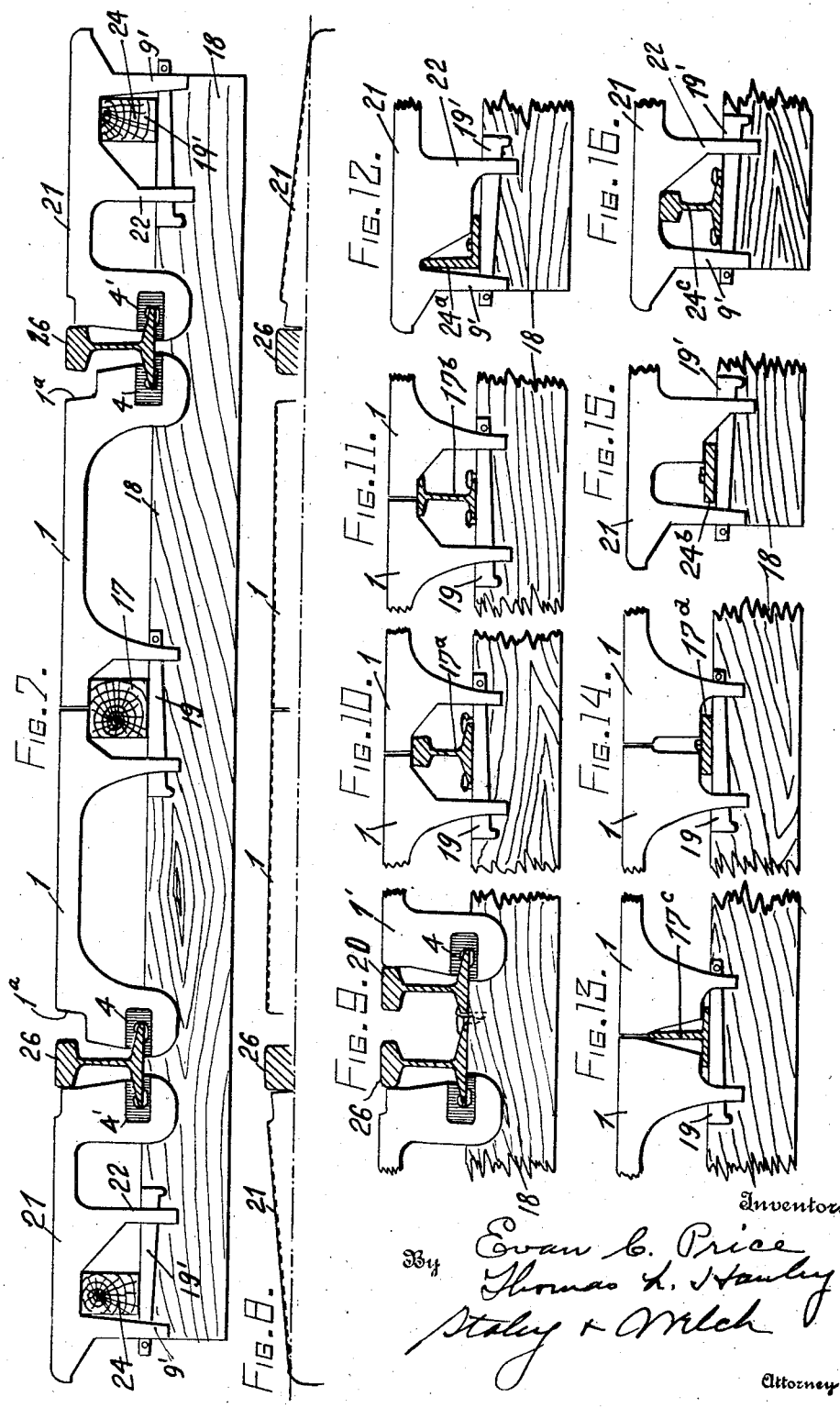

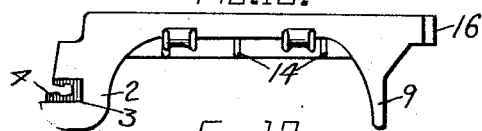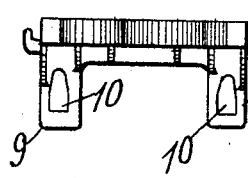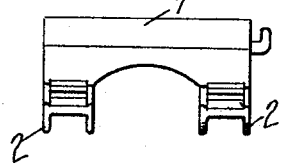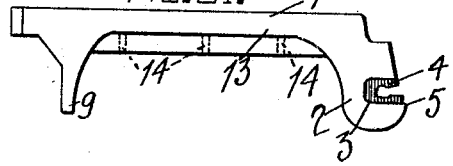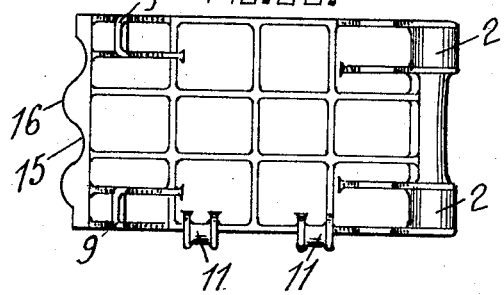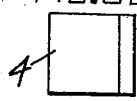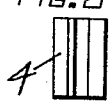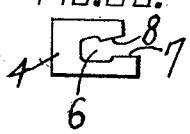

Sept. 24, 1929.   E. C. PRICE ET AL   1,729,359
HIGHWAY GRADE CROSSING FOR RAILWAYS
Original Filed March 9, 1927   5 Sheets-Sheet 4
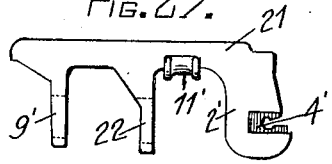
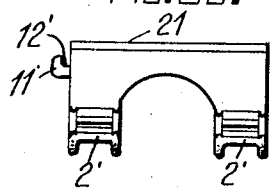
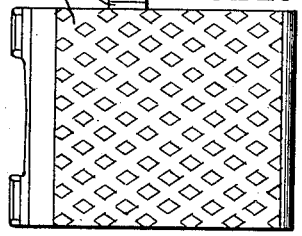
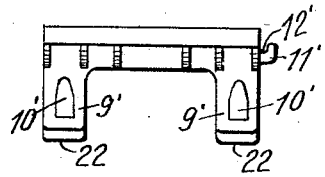
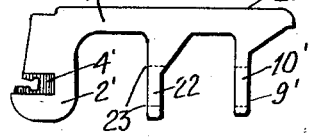
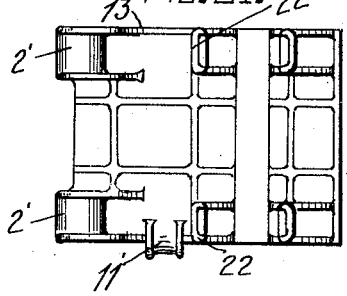

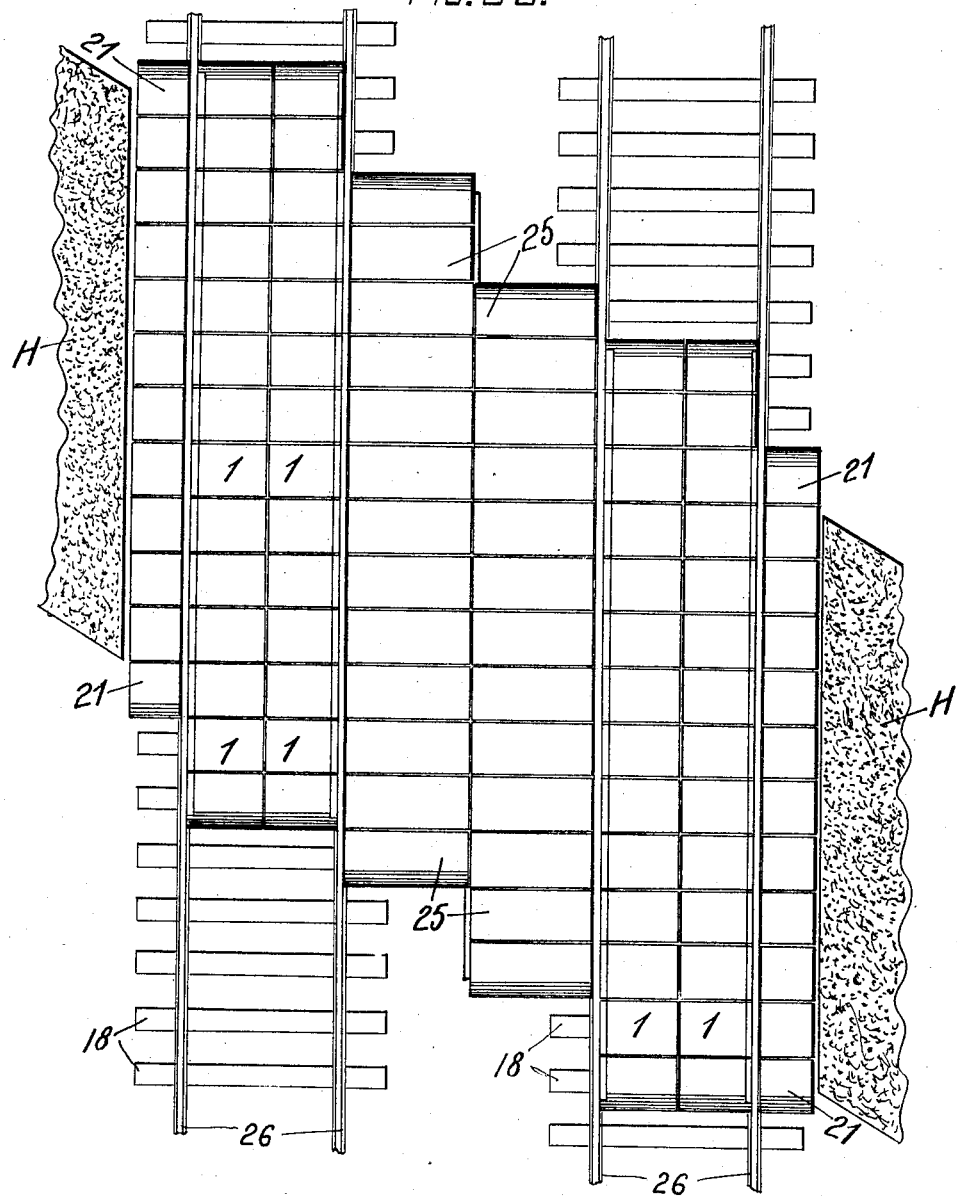

Patented Sept. 24, 1929

1,729,359

UNITED STATES PATENT OFFICE

EVAN C. PRICE AND THOMAS L. HANLEY, OF SPRINGFIELD, OHIO

HIGHWAY GRADE CROSSING FOR RAILWAYS

Application filed March 9, 1927, Serial No. 173,894. Renewed February 28, 1929.

This invention relates to highway crossings for railways, it more particularly relating to a structure which forms a crossing at grade over the railway.

An object of the invention is to provide a crossing of the character referred to which will be economical in manufacture, durable, safe and practical in construction, easily and quickly installed with few workmen, and readily removed in sections to permit access to the tie and ballast system, or renewal of the rails, or other purposes, and as readily replaced after the repairs have been made.

A further object of the invention is to provide a crossing constructed of a plurality of similarly formed units having interlocking engagement with the railway structure and also with each other whereby the sections will be locked against elevation or depression.

A further object of the invention is to provide a crossing formed in sections with provision for supporting one end of each section by the track rail and also interlocking the same with the track rail to prevent depression or elevation of that end of the section relatively to the rail.

A further object of the invention is to provide the heel end of each section of the crossing with parts designed to embrace the base of the track rail so that the rail base not only forms a support for that end of the section but holds the same against elevation; a further feature in this connection being to provide the embracing parts of the crossing section each with an insert which can be readily installed or removed which will act as an adapter to permit the crossing sections to be applied to the rails of different heights in a way to insure the top of the crossing sections being in horizontal alinement with the top of the heads of the rails, and, further, to form this insert of fiber or other suitable material so that it will act as an insulator and also as an anchor or silencer to insure a close clamping fit.

A further object of the invention is to provide for securing the toe ends of the crossing sections to the railway bed structure in a way which will permit the sections to be readily released for the purpose of removal; another feature in this connection being to also provide interlocking means between the respective sections so that when certain of the sections are secured to the railway structure, succeeding sections are likewise locked in position.

A further object is to provide for supporting those ends of the section which are remote from the rails by a beam common to all of the sections to insure a uniform and adjustable level for the sections, and to further utilize such beams as the means for locking those ends of the sections in position.

Other objects will appear from the accompanying description, claims and statement of advantages.

In the accompanying drawings:

Fig. 7 is an enlarged elevation of one end of the crossing.

Fig. 8 is a profile in side elevation of the upper surface of the crossing, showing superelevation of track.

Fig. 9 is a detail in side elevation showing the arrangement when a guard rail is employed.

Figs. 10, 11, 13 and 14 are detail views in side elevation of different forms of beams for supporting the inner ends of the crossing sections which are located between the track rails.

Figs. 12, 15 and 16 are details in side elevation of different forms of beams for supporting those crossing sections which are located outside the track rails.

Fig. 17 is a top plan view of one of the crossing sections for that part of the crossing located intermediate the track rails.

Fig. 18 is a side elevation of the same.

Fig. 19 is an elevation of the inner end of the same.

Fig. 20 is an elevation of the outer end of the same.

Fig. 21 is an elevation of that side of the section opposite to that shown in Fig. 18.

Fig. 22 is a bottom plan of said section.

Fig. 23 is a top plan of the insert which forms the adapter for the portions that embrace the track rail base.

Fig. 24 is an end view of the same.

Fig. 25 is a side elevation of the same.

Fig. 26 is a top plan view of one of the crossing sections which is located outside of the track rails.

Figs. 27 and 28 are elevations of the respective sides of the same.

Figs. 29 and 30 are views of the respective ends of the same.

Fig. 31 is a bottom plan of the same.

Fig. 32 is a top plan view of a crossing for a double railway track, also showing the manner of disposition of the crossing sections when the highway crosses the railway tracks diagonally.

The crossing is constructed of a series of units, and in Figs. 17 to 22 of the drawings there is illustrated one of these sections, 1, which form that part of the crossing between the track rails, which will be termed the intermediate sections.

Figure 1:
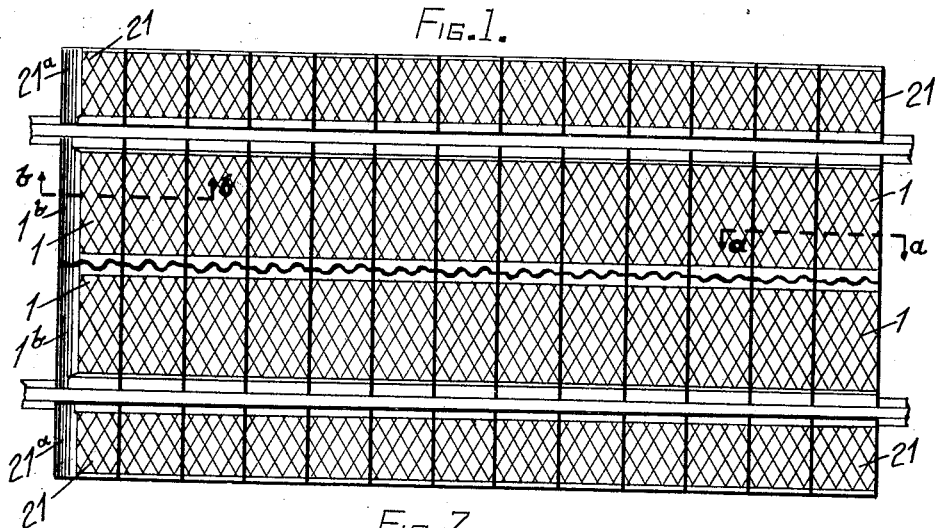
Fig. 1 is a top plan view of a crossing embodying the improvements.
Figure 2:
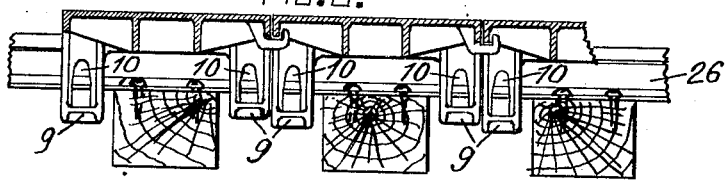
Fig. 2 is an enlarged sectional view of a portion of the same, the section being on the line $a$—$a$ of Fig. 1.
Figure 3:
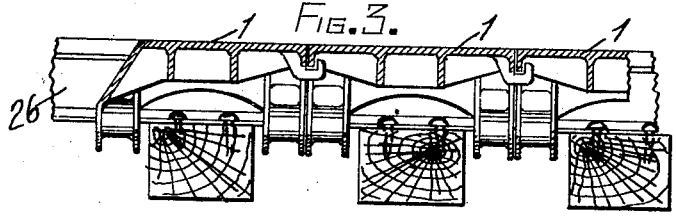
Fig. 3 is also an enlarged section of a portion of the same, the section being on a line $b$—$b$ of Fig. 1.
Figure 4:
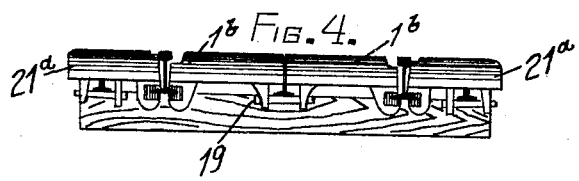
Fig. 4 is an elevation of one side of the crossing.

As shown in Fig. 1, these intermediate sections are disposed crossways between the track rails and provision is made for supporting and interlocking what will be called the heel end of each section with the base of the corresponding track rail and also for supporting and securing what will be termed the toe end to a beam-like member secured to the ties and forming a common support for the toes of all of the sections. The respective sections are also interlocked with each other in a manner to be later explained. Each section is in the form of a casing, and its heel end, meaning by that the end which interlocks with the track rail, is provided with a pair of downwardly projecting legs 2, the outer side of each of which has a recess 3 into which is driven an insert 4 of fiber or other suitable material, (see Figs. 23, 24 and 25 for detail). After the insert is driven into the recess 3, the edge of the lower lip of the recess is slightly upturned, as shown at 5 in Fig. 21, to hold the insert therein. The insert is formed with a recess 6, the outer portion of the lower wall of which is flat, as indicated at 7, while the upper wall is made shorter than the lower wall and has its outer portion outwardly and upwardly inclined as indicated at 8; the inner portion of the recess being enlarged to provide clearance. The opposite or toe end of each section has a pair of downwardly projecting arms 9, each provided with an opening 10 which is elongated in the direction of the length of the arm. One side of the section has a pair of lugs 11, the upper side of each of which has a groove 12 extending in the direction of the length of the section, while the opposite side of the section has a downwardly projecting, longitudinally extending flange 13. The upper surface of the section is preferably roughened as shown and the lower surface provided with strengthening ribs 14. The toe end is also preferably provided with alternate recesses 15 and projecting portions 16 which register with similar recesses and projecting portions on the toe end of the adjacent section.

For the purpose of a supporting the toe ends of the intermediate sections 2 a stringer or beam 17 is secured to the ties 18 midway the rails and extending parallel therewith. As shown in Fig. 7, this beam is formed of wood, but it may be an old track rail as shown at 17$^a$ in Fig. 10, and I-beam as shown at 17$^b$ in Fig. 11, a beam of inverted T-shape, as shown at 17$^c$ in Fig. 13, or a flat, shallow metallic bar as indicated at 17$^d$ in Fig. 14. To install the sections between the track rails, which are indicated at 26, each section is held at such inclination that its toe end, as well as the arms 9, will clear the central supporting beam 17, and the inserts 4 of the legs 2 are slipped onto the base of the track rail to a sufficient extent to permit the toe ends of the sections to be dropped down upon the central supporting beam 17. It should be stated here that the width of each section is such that when installed the legs 2 and arms 9 will straddle a tie in close proximity to the sides thereof to assist in preventing sidewise creeping of the sections due to vibration and creeping of the rails, the ties at the crossing being spaced at the proper distance to permit one crossing section in each cross-wise series of sections to be placed over a tie. The flat surface 7 of the insert fits the flat lower surface of the base of a track rail while the inclined surface 8 fits the inclined upper surface of the track rail base, the respective surfaces of the insert being so formed as to provide for a snug fit between the insert and base, but having enough resiliency to permit the sections to lie at an incline to the outer rails when necessary in the manner later explained. The outside dimensions of these inserts are universal so as to snugly fit the recesses 3 in the legs 2, but the recesses 6 in different inserts will vary as to height so that proper inserts may be chosen for particular heights of rails to insure the tops of the crossing sections after installation being in horizontal alignment with the tops of the heads of the track rails.

Figure 5:
Fig. 5 is a side elevation of the wedge key.
Figure 6:
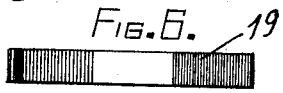
Fig. 6 is a bottom plan of the wedge key.

After all of the intermediate sections 1 have been installed between the track rails in the manner described, the outside sections 21 on each side of the crossing are secured to the track structure by inserting through the openings 10 in the arms 9 a wedge key 19, (Figs. 5 and 6 for detail), the upper surface of which engages the lower surface of the beam 17 while the lower surface is serrated or otherwise roughened as shown and engages the lower walls of the openings 10. By referring to Fig. 19 it will be seen that the lower wall of one of the openings 10 is in a lower plane than the lower wall of the other opening so that when the sections have been installed, corresponding openings of end-to-end sections will have their lower walls in different planes so as to give the required wedging effect to the inclined lower surface of the wedge key. After the heel ends of the sections 1 have been secured to the track rails and the wedges 19 driven to place, all of the sections will be locked against elevation or depression, those sections between the four outside sections being held to position by reason of the flanges 13 engaging the grooves of the lugs 11. If desired, however, all of the sections may be locked with wedge-keys.

When a guard rail is used, such as shown at 20 in Fig. 9, the heels of the intermediate sections are secured to the base of the guard rail instead of to the running rail, and special sections, such as indicated at 1' in Fig. 9, are employed. The section 1' corresponds to the section 1 in all respects excepting that it is shorter in length and lacks the wheel flange-way formed on the upper outer edge of the sections 1 as indicated at 1ª in Fig. 7. In the specifications and claims, where the term "track rail", or other similar term, is used, it is to be understood that it refers to either the running rail 26 or to the guard rail 20.

The crossing on either side of the track is similarly formed by what will be termed outer crossing sections 21, (see Figs. 26 to 31 for detail). These outer sections 21 are considerably shorter in length than the intermediate sections 1, but each has at its heel end a pair of legs 2' corresponding in form to the legs 2 and provided with the same fiber inserts 4' to receive the base of the track rail. The section 21 also has on one side edge a downwardly projecting flange 13' and on the other side edge a lug 11' having a groove 12' corresponding in form to the flange 13 and lugs 11 on each of the sections 1. Each section 21 also has a pair of downwardly extending arms 9' provided with openings 10' corresponding in form to the arms 9 and openings 10 of each of the sections 1. In addition to the arms 9', each section is provided with an additional pair of arms 22, spaced a suitable distance from the arms 9' and provided with apertures, indicated in dotted lines at 23 in Fig. 28, which are aligned with the apertures 10' in the arms 9' but have their lower walls in a lower plane than the lower walls of the apertures 10'. In Fig. 7, beams 24 similar to the beams 17 are shown secured to the ties 18 upon which the sections 21 rest with the arms 9' and 22 straddling the beams. Wedge keys 19', similar to the keys 19, are inserted through the apertures in the respective arms and engage the under side of the beams to cooperate with the track rails in locking these sections 21 in position. Other forms of beams may be employed if desired, such as the L-shaped beam 24ª of Fig. 12, a flat bar 24ᵇ such as shown in Fig. 15, or an ordinary track rail 24ᶜ such as indicated in Fig. 16. These beams 24, which ever type is employed, are spiked or lagged to the ties so as to be readily removable and thereby permit beams of different heights to be employed so as to support the toe ends of the outside sections properly to make a good joint with the surface of the highway regardless of the elevation of the track. In this conection is should be explained that some times in ballasting the track the ties are elevated so as to bring the tops of the rails above the surface of the highway as shown in Fig. 8, making it necessary to incline the outside sections as indicated in Fig. 8.

As shown at the bottom of Fig. 1, each of the outermost sections 1 and 21 has its outer side formed with a rounded downwardly hanging apron, as indicated at 21ª and 1ᵇ. This apron extends to a point in close proximity to the tops of the ties and is for the purpose of preventing dragging rolling stock parts, such as brake beams, hooks or chains from destroying the side portions of the crossing or wrecking the train.

In Fig. 32 there is shown a double railway track with the highway, indicated at H, intersecting the tracks at an oblique angle. In such an installation the intermediate sections 1 and outside sections 21 are arranged as clearly shown in this figure, and for that part of the crossing between the tracks, known as the dummy gauge, crossing sections 25 are employed, which are similar at their toe ends to the sections 1 and at their heel ends to the sections 21, lacking, in the latter respect, the wheel flange-way of section 1, being provided instead with a worn tire clearance like section 21. These sections 25 are also longer than the other sections.

A crossing thus constructed is one which is not only durable and safe, but economical in manufacture and easily and quickly installed with few workmen. Further, when the ties need reballasting or if it is desired to install new rails or make other repairs, the crossing can be readily removed and is easily replaced. In some cases, half of the sections may be removed and the ballasting or repairs accomplished, leaving the highway open to travel, and then those sections replaced and the other sections removed and the ballasting or repairs completed.

By reason of the fact that the sections are all supported at one end by the railway rails and at the other end by a stringer or beam which in turn is supported by the ties, any settling of the ties of the railway results in uniform settling of the highway crossing, and when the ties beneath the crossing are reballasted this also results in a uniform elevation of the crossing. Further, by reason of the common supporting beam for the toe ends of the sections, those outside sections which form the approach to the track may be uniformly inclined up or down in the event that the railway track is at a lower or higher elevation than the surface of the highway so that there will be no pronounced break at the juncture of those sections with the highway.

Further, by reason of the fact that while the intermediate sections are constructed in a similar manner and the outside sections likewise similarly formed as well as the sections employed to cover the dummy gauge between double tracks, this results in a crossing which is economical in manufacture and which requires no particular care upon the part of the workmen in installing the sections. Also, by this construction, all of the sections may be secured to the stringer or beam which is placed on the ties midway the rails, in a way which permits their ready detachment, or in some cases particularly for narrow crossings, just the outside sections may be secured to the beam, the inner-locking engagement between adjacent sections holding all of the other sections against elevation.

By reason of the insert which is placed in the legs at the heel ends of the sections, provision is made for readily adapting the sections to rails of different height and also for insulating the sections from the rails and providing a tie and connection with the rails. The resiliency of these inserts also absorbs shocks, retarding wear and crystallization, and also makes the crossing of more easy riding character for road vehicles and serves to insulate one rail from the other.

Having thus described our invention, we claim:

1. In a crossing of the character described, an insertable crossing section, means at one end thereof to engage the upper and under surfaces of the base of a railway rail to support that end of the section on the rail and to hold the same against elevation or depression relative to the rail, and means for supporting and securing the other end of said section independently of the railway rail.

2. In a crossing of the character described, an insertable crossing section, parts on one end thereof to engage the upper and under surfaces of the base of the railway rail to support that end of the section on the rail and hold the same against elevation or depression relatively to the rail, and means for supporting and securing the other end of said section independently of the railway rail.

3. In a crossing of the character described, an insertable crossing section, a downwardly projecting leg at one end thereof having a recess to fit the base of a railway rail so that a portion of said leg lies on the upper surface and a portion on the lower surface of said rail to support that end of the section on the rail and hold the same against elevation or depression relatively to the rail, and means for supporting and securing the other end of said section.

4. In a crossing of the character described an insertable crossing section, a downwardly projecting leg at one end thereof having a recess, an insert of non-metallic material fitted in said recess, said insert also having a recess to receive the base of a railway rail to support that end of the section on the rail and to hold the same against elevation or depression relatively to the rail and means for supporting and securing the other end of said section.

5. In a crossing of the character described, an insertable crossing section, a downwardly projecting leg at one end thereof having a recess, an insert of non-metallic material fitted in said recess, said insert also having a recess to receive the base of a railway rail to support that end of the section on the rail and to hold the same against elevation or depression, the lower wall of said insert recess being formed flat to conform to the flat under surface of said rail base and the upper wall of said recess being formed on an incline to conform to the upper surface of said rail base, and means for supporting and securing the other end of said section.

6. In a crossing of the character described, an insertable crossing section, a downwardly projecting leg at one end thereof having a recess, an insert of non-metallic material fitted in said recess, said insert also having a recess to receive the base of a railway rail to support that end of the section on the rail and to hold the same against elevation or depression, the lower wall of said insert recess being formed flat to conform to the flat under surface of said rail base and the upper wall of said recess being formed on an incline to conform to the upper surface of said rail base, said upper inclined wall being shorter than the lower flat wall of said recess, and means for supporting and securing the other end of said section.

7. In a crossing of the character described, an insertable crossing section, means at one end thereof to engage a railway rail to support that end of the section by the said rail and hold the same against elevation or depression relatively to the rail, and a beam secured to the ties of the railway structure for supporting the other end of said crossing section, and means for securing that end of the crossing section to said beam.

8. In a crossing of the character described, an insertable crossing section, means at one end thereof to engage a railway rail to support that end of the section by said rail and hold the same against elevation or depression relatively to the rail, a beam secured to the ties of the railway structure for supporting the other end of said crossing section, and means including a wedge key engaging the under surface of said beam for securing that end of the crossing section to said beam.

9. In a crossing of the character described, a pair of insertable crossing sections arranged to meet end to end at an intermediate point between the rails of a railway, means at one end of each section to engage one of the rails to said railway to support that end of the section relatively to the rail, a beam secured to the ties of the railway structure for supporting the other end of each of said section, and means for securing those ends of the sections to said beam.

10. In a crossing of the character described, an insertable crossing section, means at one end thereof to engage a railway rail to support that end of the section by the said rail and hold the same against elevation or depression relatively to the rail, a beam secured to the ties of the railway structure for supporting the other end of said crossing section, and means, including a cooperating part on each of said sections embracing said beam, togther with a device for connecting said parts, to secure said sections to said beam.

11. In a crossing of the character described, an insertable crossing section, means at one end thereof to engage a railway rail to support that end of the section by the said rail and hold the same against elevation or depression relatively to the rail, and a beam secured to the ties of the railway structure for supporting the other end of said crossing section, an arm on each of said sections adjacent said beams, and a wedge key extending through apertures in said arms and engaging the under surface of said beam to secure said sections to said beam.

12. In a crossing of the character described, a plurality of insertable crossing sections, means at one end of each section to engage the base only of a railway rail to support that end of the section by said rail and hold the same against elevation or depression relatively to the rail, means for supporting and securing the other end of each section independently of the railway rails, and overlapping parts between the sides of adjacent sections.

13. In a crossing of the character described, a plurality of insertable crossing sections, means at one end of each section to engage a railway rail to support that end of the section by said rail and hold the same against elevation or depression relatively to the rail, ties for supporting said rail, a beam secured to said ties of the railway structure at an intermediate point between the railway rails acting as a common support for the other ends of all of said sections, and means for securing the latter ends of said sections against elevation relatively to said beam.

14. In a crossing of the character described, a plurality of insertable crossing sections, means at one end of each section to engage a railway rail to support that end of the section by said rail and hold the same against elevation or depression relatively to the rail, and common means independent of the railway rails for supporting the opposite ends of said railway sections together with means for securing said ends of said sections to said common supporting means.

15. In a crossing of the character described, a plurality of insertable crossing sections, means at one end of said section to engage a railway rail to support that end of the sections by said rail and hold the same against elevation or depression relatively to the rail, and a beam forming a common support for the other ends of said sections, together with means for securing said ends of said sections to said beams.

16. In a crossing of the character described, a plurality of insertable crossing sections, means at one end of each of said sections to engage a railway rail to support that end of the sections by said rail and hold the same against elevation or depression relatively to said rail, ties for supporting said rail, a beam secured to said ties and extending parallel to said rail and acting as a common support for the other ends of said sections, and means for securing the latter end of said sections against elevation relatively to said beam.

17. In a crossing of the character described, a plurality of insertable crossing sections, means at one end of each section to engage a railway rail to support that end of the section by said rail and hold the same against elevation or depression relatively to the rail, ties for supporting said rail, a beam secured to said ties at an intermediate point between the rails acting as a common support for the other ends of all of said sections, and means for securing the latter ends of said sections against elevation relatively to said beam.

18. In a crossing of the character described, a plurality of insertable crossing sections, means at one end of each section to engage a railway rail to support that end of the section by said rail and hold the same against elevation or depression relatively to the rail, a beam secured to the ties of the railway structure at an intermediate point between the rails acting as a common support for the other ends of all of said sections, means for securing the outside sections to said beam, and overlapping parts between adjacent sections to thereby lock all of said sections against elevation relatively to the said beams.

19. In a crossing of the character described, a plurality of crossing sections arranged on the outside of a track rail, means at one end of each of said sections to engage said rail to support that end of the section by said rail and hold the same against elevation or depression relatively thereto, ties for supporting said rail, and a beam for supporting the other end of each of said sections and form a common support for all of said sections, said beam being removably secured to said ties whereby beams of different heights may be employed to compensate for varying elevations of the ties and rail relatively to the surface of the highway.

20. In a crossing of the character described, a combination, with the ties and rails of a railway, of a plurality of crossing sections consisting of intermediate sections and outer sections, one end of each of said sections having an engagement with one of the rails to hold that end against depression or elevation, said intermediate sections meeting at an intermediate point between the rails, and common means for supporting those ends of each series of outer sections farthest removed from said rail.

21. In a crossing of the character described, a plurality of insertable crossing sections, arranged side by side between the rails and on the outer sides of the rails, the outer side of each side section having a rounded, downwardly hanging apron portion.

22. In a crossing of the character described, an insertable crossing section, means at one end thereof to engage the upper and under surfaces of the adjacent half only of the base of a railway rail at a point between the ties of the railway to support that end of the section on the rail and to hold the same against elevation or depression or lateral travel relatively to the rails, and means for supporting and securing the other end of said section.

23. In a crossing of the character described, an insertable crossing section, means at one end thereof to engage the upper and under surfaces of the base of a railway rail, including an insert of non-metallic material, to support that end of the section on the rail and hold the same against elevation or depression relative to the rail, and means for supporting and securing the other end of said section.

In testimony whereof, we have hereunto set our hands this 5th day of March, 1927.

EVAN C. PRICE.
THOMAS L. HANLEY.